United States Patent [19]

Stevens

[11] Patent Number: 4,853,548
[45] Date of Patent: Aug. 1, 1989

[54] ULTRASENSITIVE RADIATION DOSIMETER AND DOSIMETRY SYSTEM

[76] Inventor: Brian Stevens, 2602 Regal Oaks La., Lutz, Fla. 33549

[21] Appl. No.: 120,037

[22] Filed: Nov. 13, 1987

[51] Int. Cl.$^4$ ............................................... G01T 1/10
[52] U.S. Cl. ............................. 250/484.1; 250/473.1; 250/485.1
[58] Field of Search ................. 250/484.1 B, 484.1 C, 250/485.1, 473.1, 472.1

[56] References Cited

U.S. PATENT DOCUMENTS

| | | | |
|---|---|---|---|
| 2,789,232 | 4/1957 | Block | 250/474.1 |
| 2,934,651 | 4/1960 | Etzel et al. | 250/365 |
| 3,648,049 | 3/1972 | Yokota et al. | 250/365 |
| 3,683,336 | 8/1972 | Brownlee et al. | 250/302 |
| 3,786,254 | 1/1974 | Yamashita et al. | 250/484.1 |
| 3,789,227 | 1/1974 | Eichner et al. | 250/484.1 |
| 3,809,901 | 5/1974 | Szalanczy et al. | 250/337 |
| 4,091,284 | 5/1978 | Yamamoto et al. | 250/337 |
| 4,209,909 | 7/1980 | Lee | 433/57 |
| 4,240,992 | 12/1980 | Petrie et al. | 264/21 |
| 4,303,857 | 12/1981 | Inoue et al. | 250/328 |
| 4,413,184 | 11/1983 | Marrone | 250/368 |

OTHER PUBLICATIONS

Review of U.S. Army Ionizing Radiation Dosimetry System, National Academy Press, Washington, D.C., 1986.

Primary Examiner—Janice A. Howell
Assistant Examiner—Constantine Hannaher
Attorney, Agent, or Firm—Richard G. Kinney

[57] ABSTRACT

A device including a dosimeter badge containing a preset quantity of an aromatic endoperoxide, $AO_2$, for example the endoperoxide of rubrene or of 9,10-diphenylanthracene in an organic matrix containing atoms of a high atomic number such as liquid O-dichlorobenzene or solid-P-dichlorobenzene. When exposed to ionizing radiation the aromatic endoperoxide decomposes to produce the fluorescent aromatic. After exposure, the badge is fluorometrically detected by exposing the pre-set quantity of light radiation and the fluorometric result measured, and a system for doing this is also disclosed. The badge preferably is constructed so as to contain two identical samples of the $AO_2$, one of which is shielded from ionizing radiation (by, e.g., lead foil envelope) during exposure use, and the other of which is unshielded to such hard radiation while both samples are shielded against light and untraviolet radiation. The two samples are thereafter unshielded and fluorescence of the two samples is compared and measured against an absolute scale in a conventional fluorimeter.

10 Claims, 2 Drawing Sheets

ULTRASENSITIVE RADIATION DOSIMETER AND DOSIMETRY SYSTEM

FIELD OF THE INVENTION

The present invention is directed to an improved radiation dosimeter and dosimetry system.

BACKGROUND OF THE INVENTION

A general background of this area is given in the text entitled 'Review of U. S. Army Ionizing Radiation System,' a report prepared by the Committee on Ionizing Radiation Dosimetry, Commission on Engineering and Technical Systems, National Research Council, and published by National Academy Press, Washington, D.C., 1986.

A great deal of work has been done in this field, and a large number of patents issued on various approaches to radiation dosimeters. Among these are the following: U.S. Pat. No. 2,789,232, issued to R. J. Block; U.S. Pat. No. 3,648,049, issued to R. Yokota, et al.; U.S. Pat. No. 3,786,254, issued to T. Yamashita, et al.; U.S. Pat. No. 3,789,227, issued to F. Eichner; U.S. Pat. No. 3,809,901, issued to A. Szalanczy, et al.; U.S. Pat. No. 4.091,284, issued to T. Yamamoto, et al.; U.S. Pat. No. 4,209,909, issued to R. Lee; U.S. Pat. No. 4,240,992, issued to E. Petrie, et al.; U.S. Pat. No. 4,303,857, issued to I. Inoue, et al.; and U.S. Pat. No. 4,413,184, issued to M. Marrone.

One well-known commercial system is the Fricke dosimeter described by J.P. Keene (J. Sci. Instr. 41 493, 1964; Rad. Res 22 14, 1964).

Basically, the prior art dosimeters use a variety of approaches, including aqueous dosimeters where dose is proportional to chemical change as measured by absorption spectrophotometry; photograph film emulsion, darkened by exposure to ionizing radiation; and the thermoluminescent dosimeter wherein detection is based on the ability of activated or doped ceramic materials to store absorbed radiation energy as seperated electrons and 'holes' (positive changes) in the structure, which energy can be released on heating as thermoluminescence.

SUMMARY OF THE INVENTION

The present invention uses the approach of detecting ionizing radiation exposure over time of a badge containing as a sensing element a pre-selected quantity of an aromatic endoperoxide ($AO_2$, for example: the endoperoxide of rubrene or 9,10-di-phenylanthracene) in an effective amount of organic matrix containing atoms of high atomic number such as liquid O-dichlorobenzene or bromobenzene, or solid P-dichlorobenzene. On exposure to ionizing radiation, the endoperoxide $AO_2$ decomposes to produce the fluorescent aromatic hydrocarbon A which is then detected by fluorimetry.

By exposing a doped badge sample to a known effective electromagnetic radiation from a frequency range for which the $AO_2$ is transparent (e.g., a near ultraviolet or visible light source) and measuring the resulting intensity of fluorescence of the sample, a linear measure of the quantity of A present and thus of the dose of ionizing radiation received by the sample is produced.

This approach allows increased theoretical sensitivity over absorption measurements of up to 10,000 and thus is particularly suitable for measuring low dosages.

Further, especially if the sample has received a very high dose, the sample's dose can also be measured by optical densitometry by detecting the e.m.r. transmitted by the dosed sample.

Other advantages include simplified analysis with commercially available equipment and non-destructive analysis (allowing repeated sensing and shielding and storage of samples).

The invention, together with the advantages thereof, may best be understood by reference to the following description taken in connection with the accompanying drawings, in the several figures of which, like reference numerals identify like elements.

'Ionizing radiation' refers herein and in the claims to X-rays, electron-bombardment, cathode rays, ionizing radiation and the like and does not include ultraviolet radiation.

'Heavy atom' refers herein and in the claims to an atom of atomic number generally equal to, or greater than, that of the element chlorine (17) and excludes those elements in the first full row of the Periodic Table of elements, specifically hydrogen, carbon, nitrogen and oxygen, in concurrence with common usage. See for example discussions of the 'heavy-atom effect' in such monographs as N.J. Turro, Modern Molecular Photochemistry, Benjamin Press, Menlo Park, 1978 and D.O. Cowan and R.L. Drisco, Elements of Organic Photochemistry, Plenum Press, 1976.

BRIEF DESCRIPTION OF THE DRAWINGS

FIG. 1b is a sectional view of the badge as seen from the plane of the line 16 —16 in FIG. 1a.

DETAILED DESCRIPTION

Figure 1:
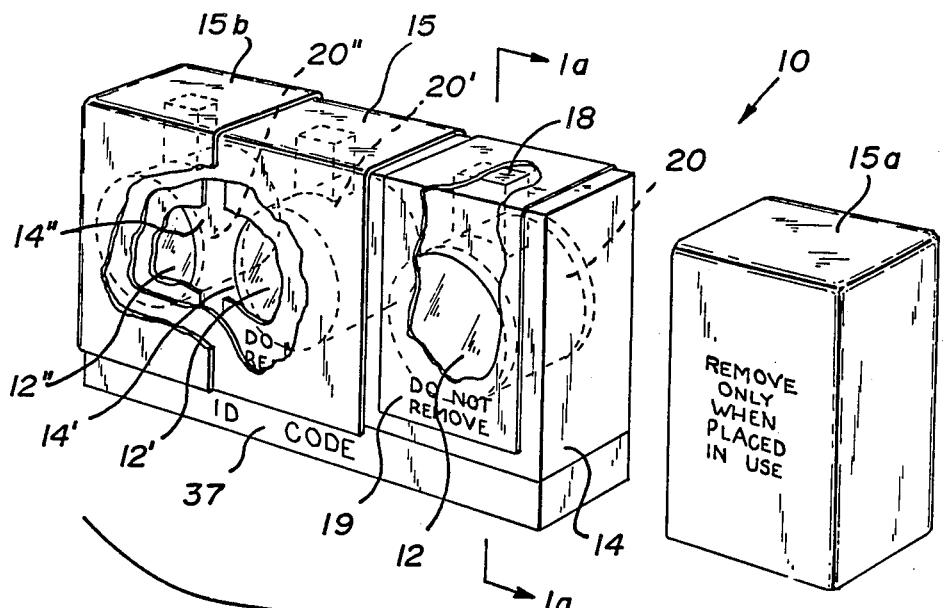
FIG. 1 is a schematic representative badge carrying a sample in accordance with the present invention.

Referring to FIG. 1, there is depicted a badge 10 which in accordance with the present invention contains a sample or element 20 containing a preselected quantity of an endoperoxide $AO_2$ where A is a fluorescent aromatic hydrocarbon. For example, the sample may be 100 ml of a 1.0 $\times 10^{-3}$ molar rubrene endoperoxide solution in solid P-dichlorobenzene.

While many badge constructions are possible within the broader aspects of the present invention, the badge 10 depicted in FIG. 1 is presently preferred. This structure consists of a sealed glass rectilinear block 14 primarily of an opaque plastic defining a disc-shaped closed compartment 12 in which the sample or element 20 is contained. For reasons to be explained below, two additional samples 20', 20" preferably identical to that of sample 20 may be provided in adjacent sealed compartments 12' and 12". The badge 10 may include a radiation code 37 which may be the same as that used with prior badges.

Figure 1A:
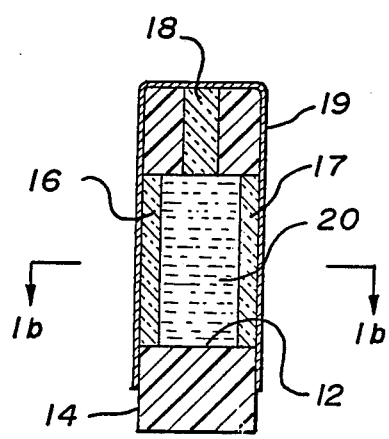
FIG. 1a is a sectional view of the badge as seen from the plane 1a —1a of FIG. 1 when looking in the direction of the arrows.

As better shown in FIG. 1a, the block 14 defines three 'windows' into the compartment 12, a pair of generally round oppositely positioned 'windows' 16 and 17, and a top 'window' 18. These are made of material transparent to light and in particular, for the aforementioned particular sample of rubrene endoperoxide the windows 16 and 17 are essentially transparent to light of a wavelength of 540 nm, while the window 18 is transparent to light in the area of a wavelength of 640 nm — the output of fluorescing rubrene.

A removable and disposable opaque cover or shielding means 19 is provided over the windows 16, 17 and 18, and the remainder of the material of the block 14 is also opaque. The cover 19 and the block are not, however, opaque to ionizing or hard radiation.

Figure 1B:
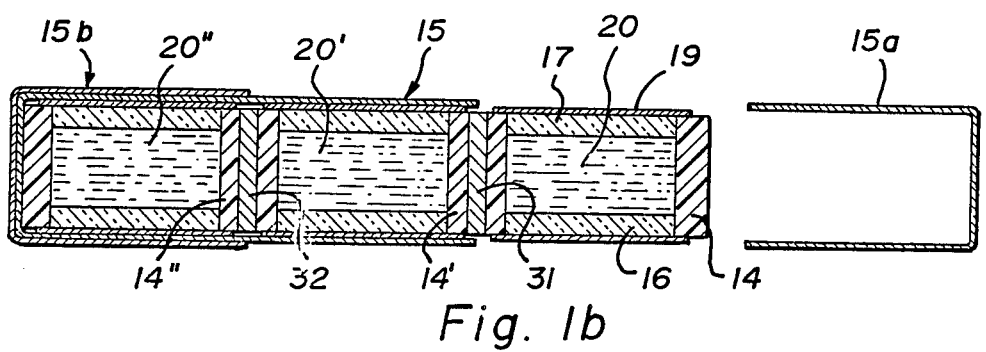

As shown in FIGS. 1, 1a and 1b, the badge 10 includes such a shield 15 which is removable in stages. The first or end stage 15a is there shown already removed. This stage is removed when the badge is put into use, e.g., when first attached to a technician operator of an X-ray machine. Otherwise, the cover 15a is kept in place. This shield is preferably lead foil of a first thickness, e.g. 1.0 mm.

The second sample 20' is covered by the same shield 15. The third sample 20" is covered by a double thickness 15b of this foil. The block 10 preferably included equipment shielding at 31, 32, so as to provide three separately shielded samples 20, 20' and 20".

After use, the badge is preferably re-covered by replacing the stage 15a and transported to a commercially available fluorimeter with modified sample compartment if necessary. There, the stage 15a and cover 15 are removed and also the light shield 15b cover and a quantity of light from the visible to ultraviolet range projected through the sample 20. This light is such that the $AO_2$ and its carrier are essentially transparent to it.

The effect of this light is to cause the free A to fluoresce. That is, to produce light at about the wavelength 640 nm for rubrene. The quantity of this light is proportional to the quantity of free A (e.g. rubrene) present which is proportional to the hard radiation dose. This is compared with the fluorescence intensity of standard samples of A in the same matrix and configuration produced by known radiation doses to yield a result in conventional radiation dosage amounts.

Figure 2:
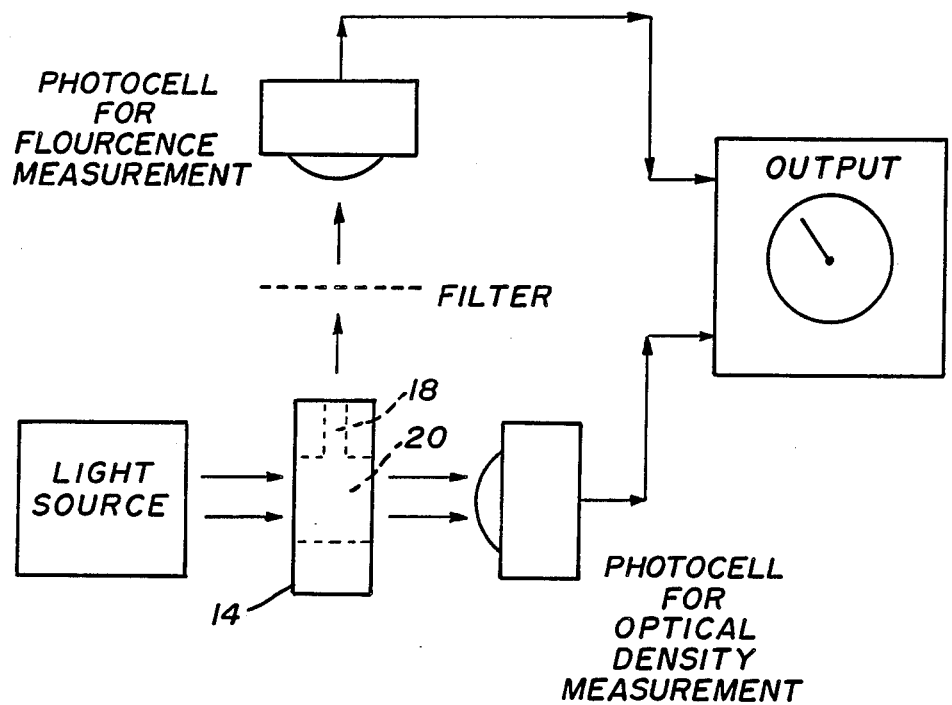
FIG. 2 is a schematic representation of a system for detecting the dosage received by the sample of a badge in accordance with the present invention.

A suitable apparatus for the scheme of FIG. 2 would be a Perkin Elmer Model 512 Dual Beam Fluorimeter. Such a system may be employed in lieu of teh thermoluminescence detection apparatus into existing automatic badge reader systems such as that depicted at page 18 of the aforementioned NRC publication.

The above described system with a single sample is entirely adequate for most purposes. However, when the badge is stored for a length of time there will be a gradual chemical deterioration which will produce a small quantity of free A and thus a small error. This is a very small error since the half-life for thermal dissociation of rubrene endoperoxide is 24 years at body temperature (B. Stevens and R.D. Small, J. Phys. Chem., 81 1605 (1977)). However, if desired, this can be overcome by providing a second identical sample such as 20' which remains shielded. In this case, the sample 20' would be exposed to the pulse of light from the same source and its reading substructed from that of the first sample 20 to remove this common error.

Again, a small error can occur when the unit 10 is exposed to a very high dosage of hard radiation. In this case the hard shielding of the second sample 20' would not block all of the high level of hard radiation. In this case the second sample 20' output would tend to overcompensate and produce a small error. This can be overcome by a further correction using the output of the third identical sample 20". Since this sample is covered by a double thickness of shielding during the dosage period, its output relative to the second sample 20', would indicate the effect of the ionizing radiation which penetrated the two levels of shielding. The relative outputs of the three samples, can be proportionally balanced to produce an even more accurate result.

A number of experiments have been carried out to prove the value of the approach of the present invention. Some of these are here described:

EXPERIMENT I 100 ml of a $1.0 \times 10^{-3}$ M solution of rubrene endoperoxide in deoxygenated O-dichlorobenzene was placed in a sealed container at a distance of 12 inches below the filament of a commercial X-ray source (GE Maximar II) and exposed to X-radiation from this source for a period of 50 minutes. The visible absorption spectrum of the exposed solution was recorded on a spectrophotometer (Perkin-Elmer UV-VIS Model 202) and found to be identical over the range 45-550 nm with that of a solution of rubrene in the same solvent at the same concentration ($1.27 \times 10^{-5}$ M, see below). This confirms the generation of rubrene from rubrene endoperoxide exposed to X-radiation in this solvent.

EXPERIMENT II

A 100.0 mg sample of solid (colorless) rubrene endoperoxide was exposed to X-radiation in a photoelectron spectrometer (McPherson ESCA) for 5 minutes. The sample turned red (the color of rubrene) and when dissolved in benzene exhibited an absorption spectrum indistinguishable from that of rubrene, to confirm that solid rubrene endoperoxide produces rubrene on exposure to X-radiation. Thus as an alternative to the solution a sample of solid rubrene endoperoxide may be employed in the badge and system.

EXPERIMENT III

Experiment I was repeated at different exposure times, and the concentration of rubrene produced was estimated from its optical density at 530 nm ($OD_{530}$) in a 1 cm cell to obtain the following data:

| exposure (minutes) | 30 | 50 | 80 | 100 | 130 |
|---|---|---|---|---|---|
| $OD_{530}$ (1 cm) | 0.08 | 0.15 | 0.21 | 0.33 | 0.40 |
| rubrene concentration ($10^5$M) | 0.68 | 1.27 | 1.78 | 2.80 | 3.39 |
| reaction rate ($10^7$ M/minutes) | 2.27 ± (0.28) | 2.54 ± (0.17) | 2.23 ± (0.11) | 2.80 ± (0.09) | 2.61 ± (0.07) |
| mean reaction rate: $2.25 \pm 0.2 \times 10^7$ M/minute | | | | | |

These demonstrate that within the error of ±0.01 unit of $OD_{530}$, the concentration of rubrene produced is a linear function of exposure time under the conditions examined, as required for practical dosimetry.

EXPERIMENT IV

Experiment I was repeated with the sample solution placed 40 inches from the X-ray source filament (50 minute exposure). $OD_{530}$ of the exposed solution was found to be 0.13±0.1 in a 10 cm path length absorption cell corresponding to a rubrene concentration of $1.1 \pm 0.1 \times 10^{-6}$M. This exposed solution was equilibrated with air (to standarize oxygen quenching of rubrene fluorescence) and its fluorescence spectrum recorded on a spectrophotofluorimeter (Aminco-Keirs) with excitation at 500 nm. The fluorescence signal (at 550 m) was then adjusted to 100.0 units on the microdensitometer scale (using the sensitivity gain control and varying the slit widths) and the procedure repeated for fresh solutions of endoperoxide exposed (at 40 inches from the source) for shorter time intervals, to obtain the following fluorescence signals:

| exposure (minutes) | 5 | 10 | 20 | 30 | 50 |
|---|---|---|---|---|---|
| $OD_{530}$ (1 cm) | 0.01 | 0.01 | 0.01 | 0.01 | 0.013 |
| fluorescence signal S (relative units) | 11 ± 2 | 20 ± 2 | 39 ± 2 | 62 ± 2 | 100 ± 2 |
| signal S/ exposure time | 2.2 ± 0.4 | 2.0 ± 0.2 | 1.95 ± 0.1 | 2.07 ± 0.07 | 2.0 ± 0.04 |

These demonstrate the linear dependence of fluorescence signal intensity on exposure time under conditions where $OD_{530}$ (1 cm) is too small for reliable estimation in a 1 cm cell.

VARIANTS AND USES

For use in monitoring individual exposure to ionizing radiation, a badge consisting of a solid sample of endoperoxide may be preferable to the use of a liquid solution. Alternatively the peroxide may be dispersed in solid solution, as for example, in P-dicholorbenzene which is transparent to visible radiation (so as not to interfere with fluorimetric analysis) or the peroxide may be absorbed on silica gel or other support. During exposure it will be necessary to protect the sample from relatively inefficient photochemical decomposition by shielding with a uv/visible absorbing filter.

Procedure applicable to any chemical system which forms fluorescent products on exposure to ionizing radiation. Other examples of such chemicals are:
 (1) 9, 10-diphenylanthracene
 (2) rubrene
 (3) 9, 10-dimethylanthracene Further, an endoperoxide solution as domestic or environmental monitoring system (in front of a TV screen or computer (VCT)) in which the solution is enclosed in plastic light-shielded vial (together with a similar control solution in a lead-shielded vial), the unshielded vials to fit the cell compartment of a single fluorimeter: Another application of this invention would be to use an endoperoxide solution as a monitoring system for small radioactive objects which are suspended in a larger volume of the solution, the radioactivity of the object being proportional to the photofluorescence intensity of a sample of the solution after a given immersion time.

A further application is as a monitoring system for radioactively contaminated air or other gas in which the air or gas is aspirated through the endoperoxide solution, the radioactivity of the air or other gas being proportional to the photofluorescence intensity of a sample of the solution.

The solid endoperoxide can be employed as the active component of personnel radiation monitoring badges as in those based on photographic film and thermoluminescent dosimeters, the dose received during a given exposure time being proportional to the photofluorescent intensity of the aromatic hydrocarbon produced from the endoperoxide.

ADVANTAGES

The present invention has the following advantages over previous practices in this field:

(a) Increased Sensitivity — an approximately one thousand-fold increase in sensitivity over detectors based on measurements of light absorption by products such as photographic film and Fricke dosimeter, (b) Measurement of Extensive Dose Range — combination of fluorimetric measurement at low dose with optical densitometry at high doses provides wide range of dose response.

(c) Simplified Analysis — requires only a single measurement of fluorescence intensity at specific wavelength, relative to that of standard. Photographic film dosimeter requires processing of exposed film (under controlled conditions) followed by densitometry. Thermoluminescent dosimetry requires sample heating under identical heating schedules and analysis of complex glow curves.

(d) Non-destructive Analysis — exposed sample is not changed by fluorimetric analysis whereas dose record in exposed TLD is destroyed when heated to obtain TL glow curve. This invention provides a time-independent readout signal which can be increased by increasing excitation (analyzing) source intensity compared with optical fiber luminescent dosimeter (e.g. U.S. Pat. No. 4,413,184) in which luminescence intensity is determined by intensity of ionizing radiation.

(e) Linear Response — fluorimetric analysis requires extremely small (<0.1%) chemical change which assumes constant g-value over this range. Other methods require much larger percentage changes in chemical composition leading to possible saturation or non-linear response at lighter doses (f) Uniform Response — fluorescence spectrum of radiation-induced product of endoperoxide is not subject to interference from other components of the system (medium or undecomposed reactant) and corresponds to region of high sensitivity of most photomultiplier detectors. TLD exhibits different glow curves in different spectral regions for different trap depths, requiring 'preheat' cycle in the reader; glow curve component from 'very deep' traps appears simultaneously with TLD incandescence.

(g) Signal Amplification — fluorescence intensity of (endoperoxide or other) decomposition product can be increased by use of more intense (laser) excitation source). Glow curve intensity of TLD is determined only by dose received and cannot be amplified in this way.

While one particular embodiment of the invention has been shown and described, it will be obvious to those skilled in the art that changes and modifications may be made without departing from the invention, and, therefore, the aim in the appended claims is to cover all such changes and modifications as fall within the true spirit and scope of the invention.

I claim:

1. A process for determining the dosage of ionizing radiation received by a location over a period of time comprising the steps of:
   (a) providing a sensing element containing an effective quantity of unexposed-to-ionizing radiation endoperoxide AO₂ in close association with dispersed heavy atoms, that is atoms of high atomic number which is equal to or greater than the atomic number of the element chlorine wherein A is a fluorescent aromatic hydrocarbon and which when exposed to ionizing radiation undergoes the transformation:

AO₂ + ionizing radiation = A + O₂

(b) exposing, over the period of time, aid sensing element and its effective quantity of AO₂ and its associated high atomic number atoms to any ionizing radiation presented to the location so that such transformation may occur while keepping said element effectively shielded from non-ionizing radiation;
   (c) thereafter, exposing the sensing element to a predetermined quantity of light from the ultraviolet through visible light spectra and sensing the intensity, if any, of fluoresence produced by free A present in response to that exposure,
   (d) correlating that fluorescence sensed with a measure of the exposure to ionizating radiation to compute the dosage of such ionizing radiation received by the location.

2. The process of claim 1 wherein said predetermined quantity of light is of a nature that the AO₂ is transparent to it.

3. A badge for sensing the dosage of ionizing radiation received by it comprising at least one element comprising an effective quantity of an endoperoxide AO₂ in a matrix having an effective amount of heavy atoms, that is atoms having a high aromatic number element which is equal to or greater than the element chlorine wherein A is a fluorescent aromatic hydrocarbon which when exposed to ionizing radiation undergoes the transformation:

AO₂ + ionizing radiation = A + O₂ such that the dosage may be derived by measuring the presence of A by fluorometric analysis and said badge including removable means for shielding said element from non-ionizing radiation.

4. The badge of claim 3 wherein said high atomic number chemical containing matrix is one of the following liquid O-dichlorobenzene, solid P-dichlorobenzene, or bromobenzene.

5. the badge of claim 4 said AO₂ is the endoperoxide of rubrene.

6. The badge of claim 3 wherein said AO₂ is the endoperoxide of rubrene.

7. A process for determining the dosage of ionizing radiation received by a location over a period of time comprising the steps of:
   (a) providing a sensing element containing an effective quantity of unexposed-to-ionizing radiation endoperoxide AO₂ wherein A is a fluorescent aromatic hydrocarbon and which when exposed to ionizing radiation undergoes the transformation:

AO₂ + ionizing radiation = A + O₂ which endoperoxide AO₂ is in an effective amount of organic matrix containing atoms of high atomic number which is equal to or greater than the element chlorine;
   (b) exposing, over the period of time, said element and its effective quantity of AO₂ to any ionizing radiation presented to the locations so that such transformation may occur while effectively shielding said element from non-ionizing radiation;
   (c) thereafter, exposing the element to a predetermined quantity of light and sensing either the fluorescence produced by the free A or the absorption of such light by the free A or both;
   (d) correlating that output sensed with a measure of the exposure to ionizating radiation to compute the dosage of such ionizing radiation received by the location.

8. The process of claim 7 wherein said matrix is one of the following liquid O-dichlorobenzene, solid P-dichlorobenzene, or bromobenzene.

9. The process of claim 8 wherein said AO₂ is the endoperoxide of rubrene.

10. The process of claim 7 wherein said AO₂ is the endoperoxide of rubrene.

* * * * *